United States Patent
Hengel et al.

(10) Patent No.: US 7,739,255 B2
(45) Date of Patent: Jun. 15, 2010

(54) SYSTEM FOR AND METHOD OF VISUAL REPRESENTATION AND REVIEW OF MEDIA FILES

(75) Inventors: Charles Hengel, Woodland, MN (US); J. Brent Longval, Chanhassen, MN (US); Paul Stroot, Minneapolis, MN (US); Jonathan Hansen, Rogers, MN (US)

(73) Assignee: MA Capital LLLP, Minnetonka, MN (US)

( * ) Notice: Subject to any disclaimer, the term of this patent is extended or adjusted under 35 U.S.C. 154(b) by 87 days.

(21) Appl. No.: 11/469,719

(22) Filed: Sep. 1, 2006

(65) Prior Publication Data

US 2008/0071827 A1 Mar. 20, 2008

(51) Int. Cl.
*G06F 17/00* (2006.01)
(52) U.S. Cl. .................. 707/705; 707/722; 707/736
(58) Field of Classification Search .......... 707/1–5, 707/102, 104.1; 715/205
See application file for complete search history.

(56) References Cited

U.S. PATENT DOCUMENTS

| | | | |
|---|---|---|---|
| 3,568,155 A | 3/1971 | Abraham et al. |
| 3,916,387 A | 10/1975 | Woodrum |
| 4,358,829 A | 11/1982 | Branigin et al. |
| 4,522,482 A | 6/1985 | Pettigrew et al. |
| 4,606,002 A | 8/1986 | Waisman et al. |
| 4,630,235 A | 12/1986 | Hashimoto et al. |
| 4,674,066 A | 6/1987 | Kucera |
| 4,849,898 A | 7/1989 | Adi |
| 4,864,501 A | 9/1989 | Kucera et al. |
| 4,864,502 A | 9/1989 | Kucera et al. |
| 4,868,750 A | 9/1989 | Kucera et al. |

(Continued)

FOREIGN PATENT DOCUMENTS

WO WO-00/54168 A1 9/2000

OTHER PUBLICATIONS

Maarek, Y., "Full Text Indexing Based on Lexical Relations. An Application: Software Libraries", *Proceedings of the 12th Annual International ACM SIGIR Conference on Research and Development in Information Retrieval (SIGIR '89)*, ACM Press,(1989), 198-206.

(Continued)

*Primary Examiner*—Mohammad Ali
*Assistant Examiner*—Huawen Peng
(74) *Attorney, Agent, or Firm*—Schwegman, Lundberg & Woessner, P.A.

(57) ABSTRACT

This document describes, among other things, systems and methods for visual representation and review of media files. A method comprises: 1) accessing a media file that includes at least an audio track; accessing a media review file, wherein the media review file is associated with the media file and further wherein the media review file includes annotation data, the annotation data including two or more users' annotation comments; 2) presenting the media file and the media review file using a graphical user interface, wherein the graphical user interface includes a vertical time bar, wherein the vertical time bar includes an indicator to indicate a position in the audio track included in the media file and further wherein annotation data displayed in the user interface vertically scrolls in synchronization with the indicator on the vertical time bar; and 3) saving any modifications to annotation data in the media review file.

6 Claims, 9 Drawing Sheets

U.S. PATENT DOCUMENTS

| | | | |
|---|---|---|---|
| 4,942,526 A | 7/1990 | Okajima et al. | |
| 4,991,087 A | 2/1991 | Burkowski et al. | |
| 5,099,426 A | 3/1992 | Carlgren et al. | |
| 5,128,865 A | 7/1992 | Sadler | |
| 5,151,857 A | 9/1992 | Matsui | |
| 5,167,011 A | 11/1992 | Priest | |
| 5,168,565 A | 12/1992 | Morita | |
| 5,225,981 A | 7/1993 | Yokogawa | |
| 5,241,674 A | 8/1993 | Kuorsawa et al. | |
| 5,263,159 A | 11/1993 | Mitsui | |
| 5,278,980 A | 1/1994 | Pedersen et al. | |
| 5,297,280 A | 3/1994 | Potts, Sr. et al. | |
| 5,303,361 A | 4/1994 | Colwell et al. | |
| 5,303,367 A | 4/1994 | Leenstra, Sr. et al. | |
| 5,309,359 A | 5/1994 | Katz et al. | |
| 5,317,507 A | 5/1994 | Gallant | |
| 5,321,608 A | 6/1994 | Namba et al. | |
| 5,321,833 A | 6/1994 | Chang et al. | |
| 5,325,298 A | 6/1994 | Gallant | |
| 5,331,556 A | 7/1994 | Black, Jr. et al. | |
| 5,369,577 A | 11/1994 | Kadashevich et al. | |
| 5,375,233 A | 12/1994 | Kimber et al. | |
| 5,377,354 A | 12/1994 | Scannell et al. | |
| 5,383,120 A | 1/1995 | Zernik | |
| 5,404,295 A | 4/1995 | Katz et al. | |
| 5,406,480 A | 4/1995 | Kanno | |
| 5,408,600 A | 4/1995 | Garfinkel et al. | |
| 5,440,481 A | 8/1995 | Kostoff et al. | |
| 5,444,842 A | 8/1995 | Bentson et al. | |
| 5,524,193 A | 6/1996 | Covington et al. | |
| 5,583,980 A | 12/1996 | Anderson | |
| 5,600,775 A | 2/1997 | King et al. | |
| 6,230,172 B1* | 5/2001 | Purnaveja et al. | 715/205 |
| 6,332,144 B1* | 12/2001 | deVries et al. | 707/102 |
| 6,484,156 B1* | 11/2002 | Gupta et al. | 707/1 |
| 6,549,922 B1 | 4/2003 | Srivastava et al. | |
| 6,789,109 B2 | 9/2004 | Samra et al. | |
| 6,956,593 B1 | 10/2005 | Gupta et al. | |
| 6,956,693 B2 | 10/2005 | Yamaguchi | |
| 7,051,275 B2 | 5/2006 | Gupta et al. | |
| 2002/0123929 A1 | 9/2002 | Speicher | |
| 2003/0070167 A1 | 4/2003 | Holtz et al. | |
| 2004/0186854 A1 | 9/2004 | Choi | |
| 2005/0138066 A1* | 6/2005 | Finke-Anlauff et al. | 707/104.1 |
| 2007/0073585 A1 | 3/2007 | Apple et al. | |
| 2008/0040227 A1 | 2/2008 | Ostermann et al. | |
| 2008/0056271 A1 | 3/2008 | Hengel et al. | |
| 2008/0126219 A1 | 5/2008 | Hengel | |

OTHER PUBLICATIONS

Salton, G., *Automatic Text Processing*, Addison-Wesley Publishing Company, Reading, MA,(1989), 229-470.

Smadja, F., "Retrieving Collocations from Text: Xtract", *Computational Linguistics*, 19, (Mar. 1993), 143-178.

Smadja, F., "Xtract: An Overview", *Computers and the Humanities*, 26, (1993), 399-413.

"U.S. Appl. No. 11/800,477 Non Final Office Action Mailed Oct. 1, 2009", 16.

"U.S. Appl. No. 11/469,737, Non-Final Office Action mailed Sep. 25, 2009", 12 Pgs.

"U.S. Appl. No. 11/800,476 , Non-Final Office Action mailed Oct. 5, 2009", 11 Pgs.

"U.S. Appl. No. 11/800,483, Non-Final Office Action mailed Oct. 5, 2009", 13 Pgs.

\* cited by examiner

FIG. 2

AUTHORIZATION FILE (122)

| LOG IN ID (200) | MEDIA FILE AUTHORIZATION (202) | NOTES AUTHORIZATION (204) |
|---|---|---|
| JOE | 120a, 120b | REV. 1, REV. 2, AUTO |
| TIM | 120a, 120c | REV. 1 |
| STEVE | 120c | REV. 2, AUTO |

FIG. 3

MEDIA REVIEW FILE (120)

DATE/TIME : 11/30/2005 2:10:51 PM
CALL CENTER : CALL CENTER XYZ
TITLE : NEVER LETS CALLER TALK
AGENT : KRISTINE
800#: 800-880-2521
TERMINATING#: 8166765325
CALL OUTCOME: SALE

| MEDIA FILE TIMESTAMP (302) | AUTOMATED DATA (304) | REVIEWER 1 (306A) | REVIEWER 2 (306B) | REVIEWER 3 (306C) |
|---|---|---|---|---|
| 0:00 | | | | |
| 0:10 | NOTE 1 | | | |
| 0:15 | | NOTE 4 | | |
| 0:20 | | | | NOTE 8 |
| 0:27 | | | NOTE 6 | |
| 0:30 | | NOTE 5 | | |
| 0:36 | NOTE 2 | | | |
| 0:41 | | | | NOTE 9 |
| 0:50 | | | NOTE 7 | |
| 0:55 | NOTE 3 | | | |
| 0:57 (308) | | | | NOTE 10 |
| 1:00 | | | | 310 |

MEDIA REVIEW FILE

| | | | | | | |
|---|---|---|---|---|---|---|
| DATE/TIME : 11/30/2005 2:10:51 PM<br>CALL CENTER : CALL CENTER XYZ<br>TITLE : NEVER LETS CALLER TALK<br>AGENT : KRISTINE | | | | 800#: 800-880-2521<br>TERMINATING#: 8166765325<br>CALL OUTCOME: SALE | | |
| | MEDIA FILE TIMESTAMP | AUTOMATED DATA | REVIEWER 1 | REVIEWER 2 | REVIEWER 3 | JOE |
| | 0:00 | | | | | |
| | 0:10 | ➤ NOTE 1 | | | | |
| | 0:15 | | ➤ NOTE 4 | | | |
| | 0:20 | | | | ➤ NOTE 8 | |
| | 0:27 | | | ➤ NOTE 6 | | |
| | 0:30 | | ➤ NOTE 5 | | | |
| | 0:36 | ➤ NOTE 2 | | | | |
| | 0:41 | | | | ➤ NOTE 9 | |
| | 0:50 | | | ➤ NOTE 7 | | |
| 402 | 0:51 | | | | | ➤ NOTE 11 |
| | 0:55 | ➤ NOTE 3 | | | | |
| | 0:57 | | | | ➤ NOTE 10 | |
| | 1:00 | | | | | |

| RAD | |
|---|---|
| START DATE : | 11/28/2005 ▽ — 502A |
| END DATE : | 12/1/2006 ▽ — 502B |
| SELECT MULTIPLE PRODUCTS : | SELECT ALL PRODUCTS △<br>COFFEE<br>SHOES<br>SOFAS<br>TENTS ▽ — 502C |
| AND SPECIFIC 800 # : | ▽ — 502D |
| TERMINATING NUMBER : | — 502E |
| RECORDING HOUR RANGE : | ▽ TO ▽ — 502F |
| RECORDING LENGTH RANGE : | TO — 502G |
| CALL OUTCOME : | SALE ▽ — 502H |
| CALL COMMENT TYPE : | SELECT A COMMENT TYPE ▽ — 502I |
| REVIEWED MA CALLS ONLY : | ☑ ALL EMPLOYEES ▽ |
| REVIEWED ADVERTISER CALLS ONLY : | ☐ } 502J |
| REVIEWED CALL CENTER CALLS ONLY : | ☐ |
| CALLER ID : | — 502K |
| RECORDING ID : | — 502L |
| RECORDING CALL COUNT : | 8 — 502M |

( SEARCH ) — 504
(5000 CALL MAXIMUM)

506 — ( RESET )

*FIG. 5*

NEW INTERNAL SEARCH | NEW EXTERNAL SEARCH | VIEW DOWNLOAD CART

RAD

RECORDED AUDIO DELIVERY

CALL LOG
FOUND 8 CALLS THAT MATCH

| | FLASH | MA | AD | CC | PROD | DATE/TIME | HR | REMOTETN | ST | CELL | LENGTH | INCOMING 800# |
|---|---|---|---|---|---|---|---|---|---|---|---|---|
| ☐ | 2 | 0 | 0 | PROC | | 11/28/2005 10:47:17 AM | 10 | 7185556256 | NY | 773 | | 800-555-3122 |
| ☐ | 1 | 0 | 0 | EYEP | | 11/28/2005 10:50:06 AM | 10 | 9195558611 | NC | 687 | | 800-555-7999 |
| ☐ | 3 | 0 | 0 | PROC | | 11/28/2005 11:01:40 AM | 11 | 6095553308 | NJ | 732 | | 800-555-9110 |
| ☐ | 1 | 0 | 0 | AVCR | | 11/28/2005 2:30:45 PM | 14 | 4195553689 | OH | 746 | | 800-555-1605 |
| ☐ | 3 | 0 | 0 | PROC | | 11/29/2005 7:04:24 AM | 7 | 7185558137 | NY | 762 | | 800-555-3122 |
| ☐ | 1 | 0 | 0 | LACT | | 11/30/2005 12:52:51 PM | 12 | 3365557280 | NC | 578 | | 800-555-7109 |
| ☐ | 4 | 0 | 0 | SPED | | 11/30/2005 2:10:51 PM | 14 | 6175552386 | MA | 670 | | 800-555-2521 |
| ☐ | 1 | 0 | 0 | WLGL | | 11/30/2005 5:57:39 PM | 17 | 8135554623 | FL | 1773 | | 800-555-5695 |

*FIG. 6*

SYSTEM FOR AND METHOD OF VISUAL REPRESENTATION AND REVIEW OF MEDIA FILES

TECHNICAL FIELD

This patent document pertains generally to graphical user interfaces, and more particularly, but not by way of limitation, to visual representation and review of media files.

BACKGROUND

Media files, including audio or video files, are continually being created for many different types of applications. Telemarketer conversations, video broadcasts, books recorded on tape, university lectures, and video recordings of golf swings are only a few examples of the various types of media files that exist.

BRIEF DESCRIPTION OF THE DRAWINGS

FIG. 2 illustrates an example of the data stored in an authorization file in accordance with an example embodiment.

FIG. 3 illustrates an example of data stored in a media review file in accordance with an example embodiment.

FIG. 4 illustrates a further example of data stored in a media review file after a review by reviewer "Joe" in accordance with an example embodiment.

FIG. 5 illustrates an example search graphical user interface ("GUI") in accordance with an example embodiment.

FIG. 6 illustrates an example list GUI in accordance with an example embodiment.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments.

The following detailed description does not, therefore, limit the scope of the invention, which is defined only by the appended claims.

Often media files are reviewed and annotated. For example, telemarketer conversations may be recorded as an audio file, with subsequent reviewers analyzing the recorded conversations and annotating, for example, mistakes, profanity, and sales events. News or sports broadcasts may be recorded as a video file with important aspects of the broadcast highlighted with annotations. There are many other examples of situations where media files are reviewed.

A media file may be reviewed and annotated by multiple reviewers. For example, an advertising agency may have multiple marketing executives analyzing an audio file of a telemarketing phone call. In some cases, it is useful for each marketing executive to analyze a previous reviewer's annotations, while at the same time, contributing his own annotations. Moreover, reviewing a media file is a time-consuming process. What is needed is a better way to facilitate the review of media files by multiple reviewers.

The present invention is a system for, and method of, visual representation and review of media files. In particular, a media file reviewing system provides mechanisms for reviewing media files in a visual fashion, displaying media files and the accompanying annotations in a highly readable fashion, searching media files, and facilitating the review of media files by multiple reviewers.

Figure 1:
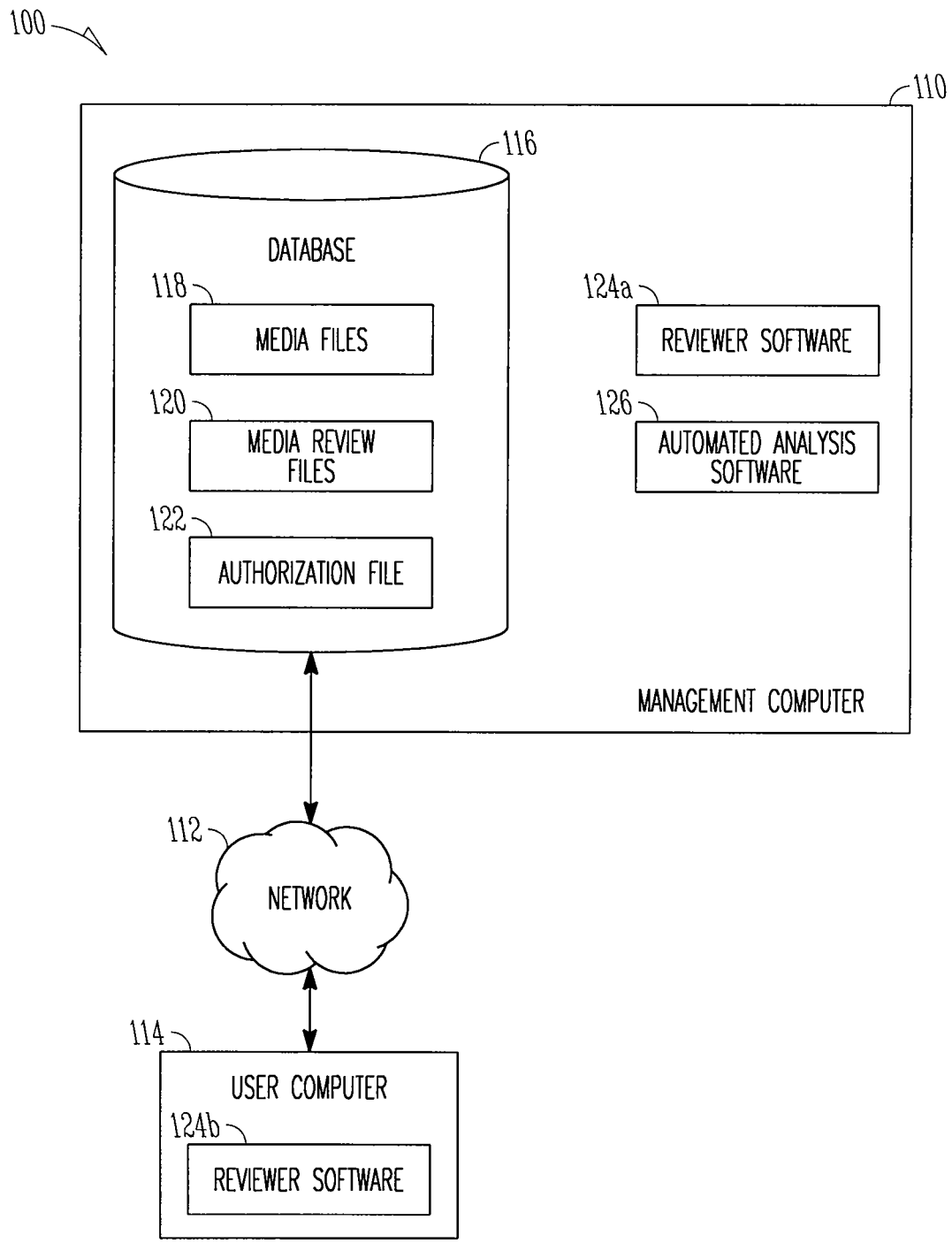
FIG. 1 illustrates a functional block diagram of a media file reviewing system in accordance with an example embodiment.

FIG. 1 illustrates a functional block diagram of a media file reviewing system 100 in accordance with an example embodiment. In an embodiment, media file reviewing system 100 includes a management computer 110, a network 112, and a user computer 114. Management computer 110 further includes a database 116 that further contains a plurality of media files 118, a plurality of media review files 120, and an authorization file 122; a first instance of reviewer software 124, which is represented by reviewer software 124a; and automated analysis software 126. User computer 114 further includes a second instance of reviewer software 124, which is represented by reviewer software 124b.

In embodiments, management computer 110 is any standard computer used to store, search, or authorize access to media files. Management computer 110 may contain industry-standard components, including databases (e.g., database 116), as well as software (e.g., reviewer software 124a). Network 112 is a communications network, such as a local area network (LAN), wide area network (WAN), intranet or Internet. User computer 114 includes any standard networked computer and may be used to access management computer 110 via network 112. User computer 114 includes software, such as reviewer software 124b.

In embodiments, each instance of reviewer software 124 is a software program that graphically represents a media file for review and annotation, determines which media files a reviewer is authorized to access, and processes media file queries. Reviewer software 124 may be a client-based software module, as is depicted with reviewer software 124b, or a server-based software module, as is depicted with reviewer software 124a, in various embodiments.

In an embodiment, database 116 is a database that contains a comprehensive collection of related data. In an embodiment, various data associated with media files is stored in database 116. In some embodiments, database 116 contains media files 118, media review files 120, and authorization file 122. In some embodiments, database 116 is implemented as a relational database, such as an Oracle database by Oracle Corporation (Redwood Shores, Calif.). Media file 118 may be a standard audio, video, or advanced content source file, including, but not limited to, a WAVE form audio format (WAV) file, an Audio Video Interleave (AVI) file, an MPEG Audio Layer-3 (MP3) file, or an MPEG-4 Part 14 (MP4) file. Audio files may include, for example, recorded phone calls, university lectures, or books on tape. Video files may include, for example, television broadcasts or recorded golf swings. In an embodiment, each media review file 120 is associated with a media file 118, where the media review file 120 contains a record of any reviewer annotations that are related with the associated media file 118. Authorization file 122 contains, in some embodiments, data that identifies which media files, if any, each reviewer is authorized to view and annotate.

In an embodiment, automated analysis software 126 includes a software program that analyzes each media file 118 for data that may be detected automatically, such as profanity, meta-data, whether a sale was made or voice inflections (e.g., yelling). For example, automated analysis software 126 may review media file 118 and determine calls that did not result in a sale and contained profanity or yelling.

In operation, automated analysis software 126 evaluates media files 118 and stores automated analysis annotations in the associated media review files 120, in an embodiment. A user may then initiate a review using review software 124b on user computer 114, connect to the management computer 110, and enter a query using reviewer software 124b. Reviewer software 124b may then access authorization file 122 of database 116 to determine which media files 118 and media review files 120 the user is authorized to access. In an embodiment, reviewer software 124b determines the user's authorization by cross-referencing the user log-in data (e.g., a username) with authorization file 122. Reviewer software 124b then uses the query information to perform a search of authorized media files 118 and media review files 120. A list of authorized media files 118 and media review files 120 that have the associated notations is displayed by reviewer software 124b on user computer 114. The user may then select a media review file 120 of interest for review. Using reviewer software 124b, the user may add annotations to the selected media review file 120. Upon completion, the selected media review file 120 is saved and the updated file containing the revised annotations is stored in database 116. Alternatively, the above-described operations are performed using server-based reviewer software 124a of management computer 110.

FIG. 2 illustrates an example of the data stored in an authorization file 122 in accordance with an example embodiment. The "Log-in ID" field 200 identifies a user or reviewer. The "Media file 120 Authorization" field 202 identifies one or more media review files 120 a user or reviewer is authorized to review. The "Notes Authorization" field 204 identifies one or more notes (e.g., annotations) which a user or reviewer is permitted to review (e.g., reviewer 1, reviewer 2, or automated annotations).

As illustrated in FIG. 2, Joe may access media files 120a and 120b. Further, Joe may view the notes of reviewer 1 ("Rev. 1"), reviewer 2 ("Rev. 2"), and any automated annotations ("Auto") in the media files 120a or 120b.

FIG. 3 illustrates an example of data stored in a media review file 120 in accordance with an example embodiment. Media review file 120 may, in some embodiments, be stored in a relational database (e.g., database 116) or alternatively, as a file in a file system. In an embodiment, media review file 120 contains descriptive information 300, such as a date and time of the recording, an place of the recording, a title, an outcome, or other descriptive or identifying information. In addition, one or more notes may be included in media review file 120. In an embodiment, the notes are embedded in media review file 120. In an alternative embodiment, media review file 120 contains pointers or other references to notes, which may be contained, for example, in a related table in a relational database.

In embodiments, media review file 120 includes a media file timestamp 302, and a division for each reviewer, such as automated annotation data 304, a first reviewer 306A, a second reviewer 306B, and a third reviewer 306C. Each note 310 has an associated timestamp 308 and reviewer 306C.

FIG. 4 illustrates a further example of data stored in a media review file 120 after a review by reviewer "Joe" 404 in accordance with an example embodiment. The reviewer Joe 404 has not previously reviewed media review file 120 and so another division (e.g., column) is represented that contains review notes provided by Joe. In this example, Joe has provided "Note 11" 400 at the 0:51 timestamp 402.

FIG. 5 illustrates an example search graphical user interface (GUI) 500 in accordance with an example embodiment. One or more controls (e.g., 502A, 502B, 502C) may be used by a user to define one or more constraints. Constraints may include a start date 502A, an end date 502B, a product 502C, an 800 number 502D, a terminating number 502E, a recording hour range 502F, a recording length range 502G, a call outcome 502H, a call comment type 502I, a review status 502J, a caller identification (ID) 502K, a recording ID 502L, or a returned call count 502M. After a user configured the controls 502 to reflect the desired search constraints, the user can activate a submission control 504 to submit the query. To reset the search parameters 502, the user can activate the reset control 506.

FIG. 6 illustrates an example list GUI 600 in accordance with an example embodiment. For example, as a result of a search performed using the search GUI (FIG. 5), list GUI 600 displays any matching media review files 120 and allows the user to select one or more media review files 120 to review.

Figure 7:
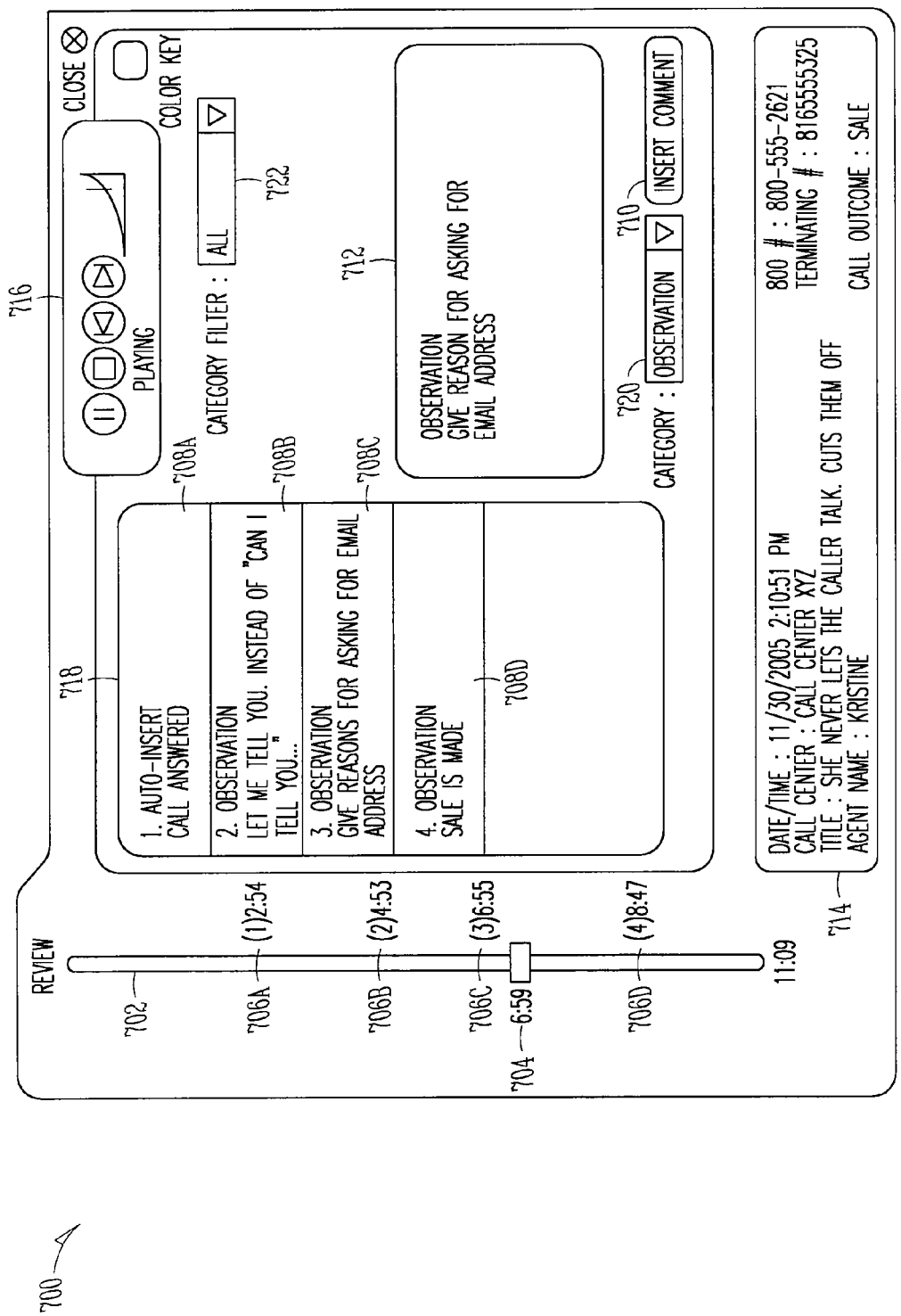
FIG. 7 illustrates an example reviewer software GUI in accordance with an example embodiment.

FIG. 7 illustrates an example reviewer software GUI 700 in accordance with an example embodiment. Reviewer software GUI 700 includes a vertical time bar 702, a time bar mark 704, zero or more comment marks 706 (e.g., comment marks 706A, 706B, 706C, and 706D), zero or more comments fields 708 (e.g., comments fields 708A, 708B, 708C, and 708D), an insert comment control 710, a text input control 712, a call data field 714, and control icons 716.

Vertical time bar 702 includes a graphical representation of the time-based length of a media file 118 in a vertical orientation. In this example, a media file 118 with duration of 11:09 is being reviewed.

Time bar mark 704 includes a graphical indication of a current location within a media file 118. In an embodiment, time bar mark 704 may be manipulated by a user, for example, sliding the bar up (e.g., toward the beginning of the recording) or down (e.g., toward the end of the recording). In an embodiment, time bar mark 704 gradually moves (e.g., an animated control) as the recording is played to the user. In this example, time bar mark 704 is at the 6:59 mark, indicating that the recording is 6 minutes and 59 seconds from the beginning.

During operation, in an embodiment, a user may provide a comment in text input control 712 to insert or revise a comment using insert comment control 710. When a comment is inserted or revised, time bar mark 704 is used to determine the associated time of the comment and the comment is displayed in comment control 718. The user may provide a category for the comment using a category control 720. Different categories may be available depending on the use of the reviewer software, the user or user privilege level, or other factors. For example, categories available when the reviewer software is used to review call center sales calls may include "observation," "accolade," "criticism," or the like. In another example, some users with more or fewer rights or privileges may be able to utilize more or fewer comment categories.

In this example, four comments are associated with media review file 120 and are represented graphically by comment marks 706A, 706B, 706C, and 706D in comment control 718. Comment fields 708A, 708B, 708C, and 708D represent text that is associated with each comment mark 706. In the example illustrated in FIG. 7, comment field 708A is associated with comment mark 706A, comment field 708B is associated with comment mark 706B, and so on. A user may view comment fields 708 to quickly ascertain details of the recording. In an embodiment, during playback of media file 118, comments in comment control 718 scroll to correspond with the position of time bar mark 704 on vertical time bar 702. In an embodiment, the user may filter on the comment categories by using a filter control 722. In the example shown, the filter control 722 is set to "All" so that any available comments in any category are shown to the user. In some embodiments, comments are presented with one or more colors to indicate the comment's category, the comment's author, or other characteristics of the comment.

In an embodiment, call data field 714 displays information associated with media file 120. Control icons 716 may include controls to manage playback of media file 120, such as play, stop, pause, fast forward, rewind, and the like.

Figure 8:
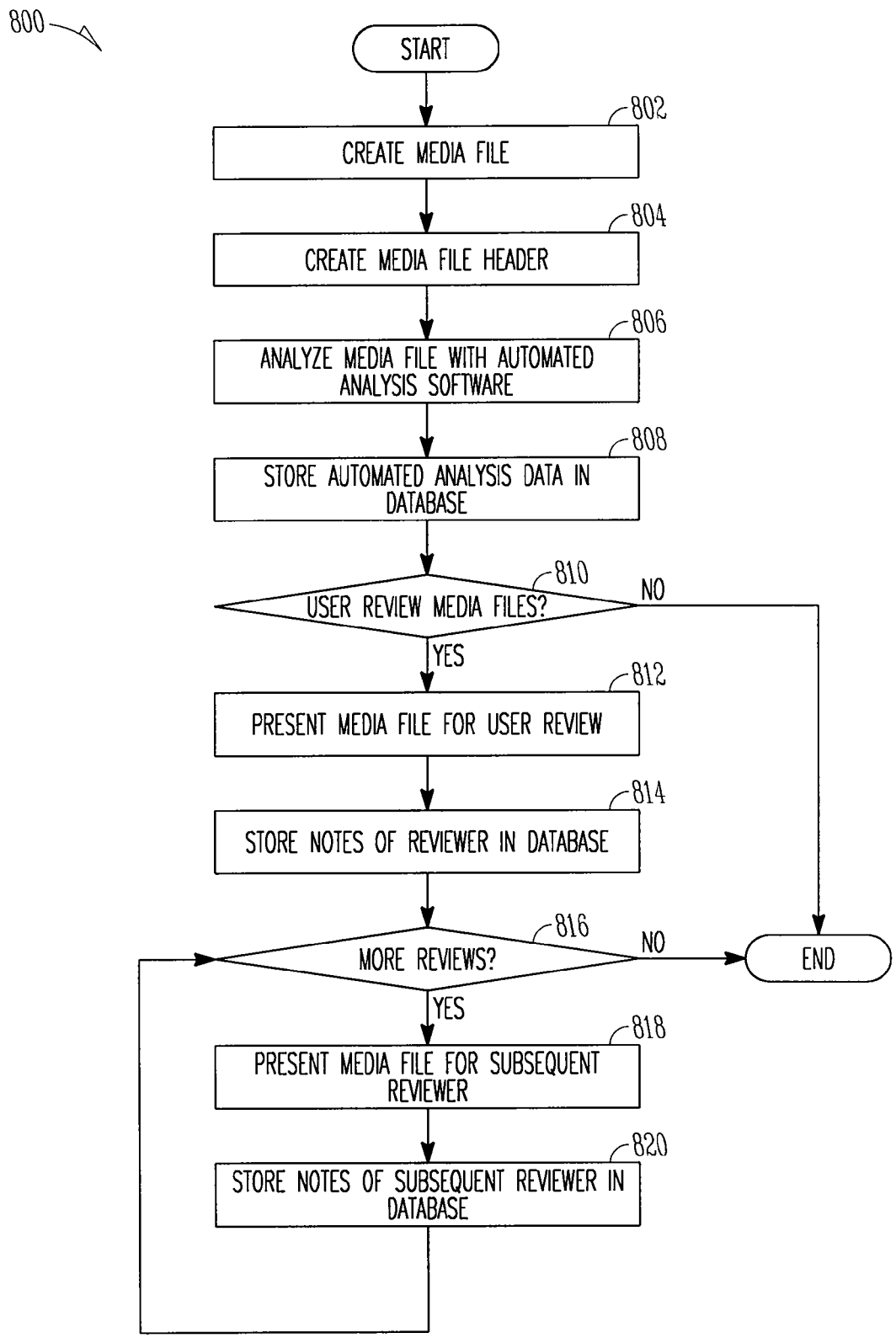
FIG. 8 illustrates a flow diagram of a method of creating and maintaining a database in a media file reviewing system in accordance with an example embodiment.

FIG. 8 illustrates a flow diagram of a method 800 of creating and maintaining a database 116 in a media file reviewing system 100 in accordance with an example embodiment. At block 802, a media file 118 is created. For example, an audio or video event is digitally recorded and stored in an associated media file 118 of database 116.

At block 804, a media review file header is created. In an embodiment, each media file 118 stored in database 116 includes a media review file 120 with a media review file header. In embodiments, the media review file header includes descriptive information of the associated media file 118 such as a date, a time, a title, an agent, or the like. In an embodiment, media review file 120 and its header data are generated at the time that media file 118 is created. In a further embodiment, header data is not updateable by reviewer software 124.

At block 806, automated analysis software 126 analyzed the media file 118. In an embodiment, automated analysis software 126 updates media review file 120 with results of the automated analysis. Automated review includes, in various embodiments, detection of profanity, voice inflection, or the like. Incidents of detected events may be recorded at block 808 in database 116 (e.g., media review file 120), in some embodiments.

At block 810, the method 800 determines whether a user (e.g., reviewer) desires to review a media file 118. If the user does not wish to review a media file 118, then the method 800 ends.

At block 812, a user (e.g., reviewer) reviews a media file 118 by use of reviewer software 124. At block 814, notes created by the user are stored in database 116. In an embodiment, the notes are stored in media review file 120 along with an indication of the reviewing user.

At block 816, the method determines whether any subsequent reviewer desires to review the media file 118. If there are no subsequent reviewers, the method 800 ends.

At block 818, a subsequent user reviews media file 120 using reviewer software 124. Any number of subsequent reviewers may review media file 118 and its associated media review file 120. At block 820, any notes created by the subsequent users in block 818 are stored in media review file 120.

Method 800 of creating and maintaining database 116 advantageously provides efficient searching through the use of media review file headers, efficient reviewing of media review files 120 and any related or associated notes or comments, and better facilitation of multiple reviews by simultaneously displaying reviewer notes regarding a particular media file 118.

Figure 9:
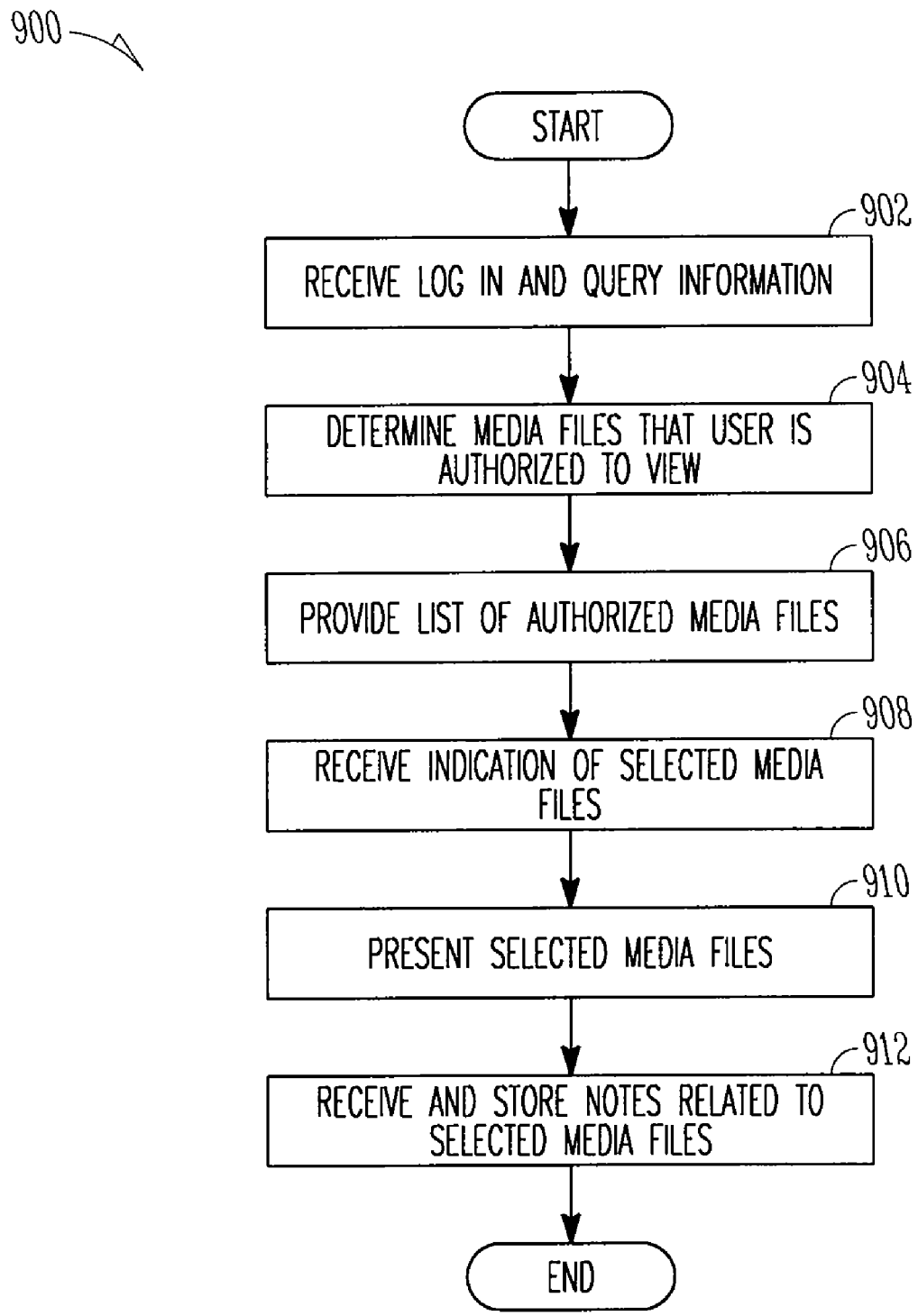
FIG. 9 illustrates a flow diagram of a method of using the media file reviewing system in accordance with an example embodiment.

FIG. 9 illustrates a flow diagram of a method 900 of using the media file reviewing system 100 in accordance with an example embodiment. At block 902, the method 900 receives user authentication information (e.g., a username and password) and if the user is authenticated, then a query is received. In an embodiment, the query includes one or more search constraints and is directed to search for matching media files 118 in database 116.

At block 904, using the user's authorization information (e.g., username), a set of zero or more media files 118 from the set of all media files 118 matching the user's query from block 902 are found. The subset of media files 118 are those that the user has access or authorization to review. In an embodiment, reviewer software 124 accesses authorization file 122 in order to determine to which media files 118 and media review files 120 the user is authorized to access. Reviewer software 124 may do so by cross-referencing the user log-in data with authorization file 122.

At block 906, the subset of media files 118 to which the user is authorized to review are displayed for the user. In an embodiment, the subset of media files 118 is displayed using a list view, such as illustrated in FIG. 6.

At block 908, one or more indicators are received, where each indicator represents a media file 118 that the user wishes to review. In an embodiment, the user may use a control (e.g., a checkbox) to indicate which files are of interest.

At block 910, selected media files 118 are presented to the user for review. In an embodiment, the reviewer reviews media files 118 and media review files 120 using reviewer software 124.

At block 912, review notes are received and stored by the management computer 110. In an embodiment, the notes include annotations, such as observations, comments, event indications, and the like. In an embodiment, notes for a media file 118 are stored in an associated media review file 120 in database 116.

Thus, as described above, the inventive subject matter provides a way to increase the speed at which media files are reviewed. The appearance of a graphical user interface (GUI) while reviewing media files contributes to the effectiveness of the reviewer. The review and annotation of the media file are made more efficient and convenient. Further, upon completion of a review and annotation of the media file, embodiments of the inventive subject matter provide for searching the various media files and annotations for specific occurrences. For example, all telemarketing calls that are recorded as audio files and result in a sale may be searched for further analysis. According to other aspects of the inventive subject matter, a system for and method of easily facilitating the review of media files by multiple reviewers is provided.

Figure 10:
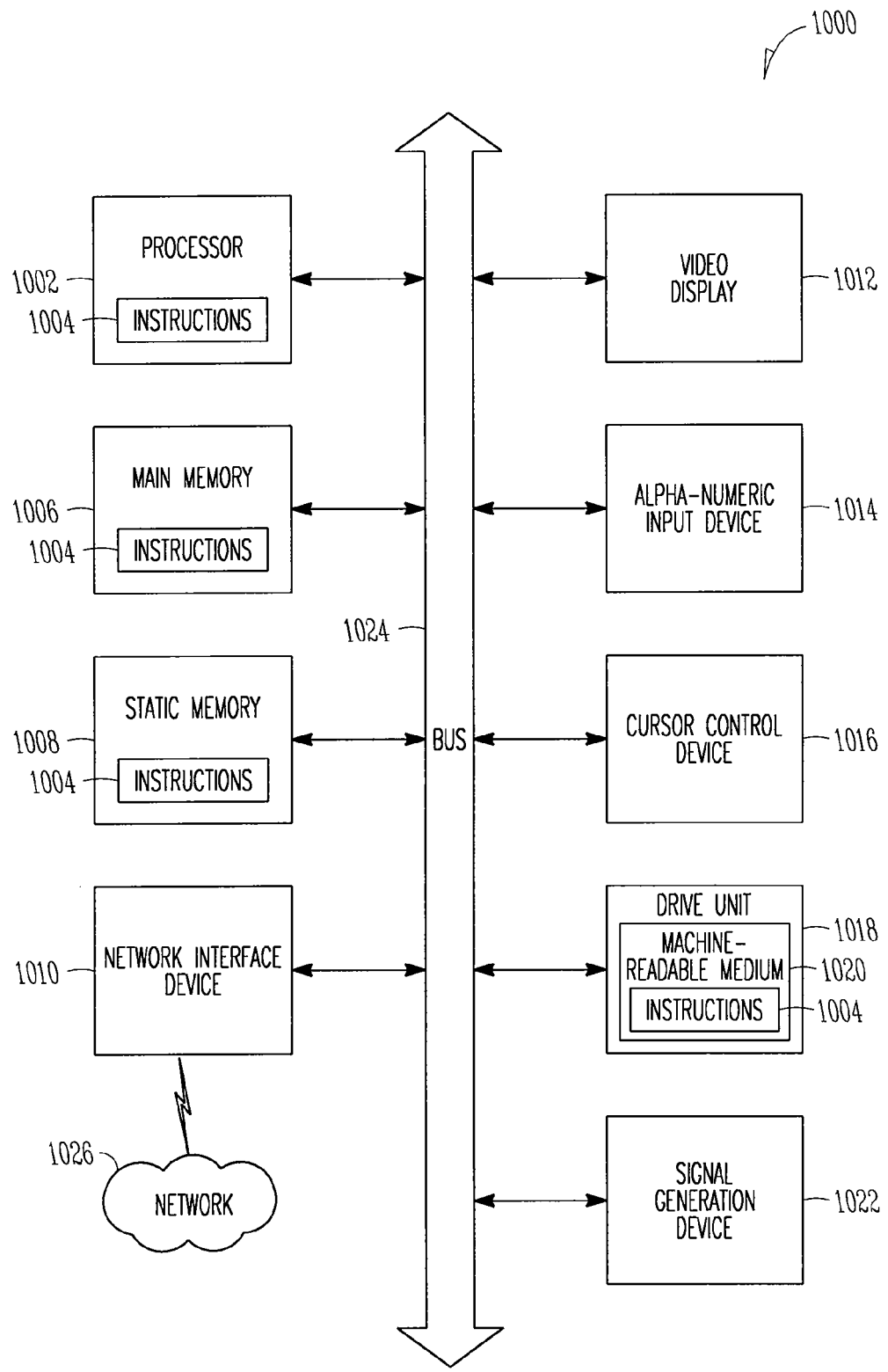
FIG. 10 illustrates a diagrammatic representation of a machine capable of performing the methods or implementing the systems/devices described herein.

FIG. 10 illustrates a diagrammatic representation of a machine 1000 capable of performing the methods or implementing the systems/devices described herein. In alternative embodiments, the machine may comprise a computer, a network router, a network switch, a network bridge, a Personal Digital Assistant (PDA), a cellular telephone, a web appliance, a set-top box (STB), or any machine capable of executing a sequence of instructions that specify actions to be taken by that machine.

The machine 1000 includes a processor 1002, a main memory 1004, and a static memory 1006, which communicate with each other via a bus 1008. The machine 1000 may further include a video display unit 1010 (e.g., a liquid crystal display (LCD) or a cathode ray tube (CRT)). The machine 1000 also includes an alphanumeric input device 1012 (e.g., a keyboard), a cursor control device 1014 (e.g., a mouse), a disk drive unit 1016, a signal generation device 1018 (e.g., a speaker), and a network interface device 1020 to interface the computer system to a network 1022.

The disk drive unit 1016 includes a machine-readable medium 1024 on which is stored a set of instructions or software 1026 embodying any one, or all, of the methodologies described herein. The software 1026 is also shown to reside, completely or at least partially, within the main memory 1004 and/or within the processor 1002. The software 1026 may further be transmitted or received via the network interface device 1020.

For the purposes of this specification, the term "machine-readable medium" shall be taken to include any medium which is capable of storing or encoding a sequence of instructions for execution by the machine and that cause the machine to perform any one of the methodologies of the inventive subject matter. The term "machine-readable medium" shall accordingly be taken to include, but not be limited to, solid-state memories, optical and magnetic disks, and carrier wave signals. Further, while the software is shown in FIG. 10 to reside within a single device, it will be appreciated that the software could be distributed across multiple machines or storage media, which may include the machine-readable medium.

Although specific embodiments have been illustrated and described herein, it will be appreciated by those of ordinary skill in the art that any arrangement that achieves the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

The invention claimed is:

1. A computer implemented method for reviewing media files within a media file review application, the method comprising:

accessing a media file that includes an audio track;

analyzing the media file with automated analysis software on one or more computers, wherein the automated analysis software creates one or more automatically-generated annotations related to content in the media file;

storing the one or more automatically-generated annotations in a database;

presenting the media file for manual review within a media file review application, wherein presenting the media file includes:

extracting at least one of the one or more automatically-generated annotations from the database;

loading the media file into the media file review application;

determining temporal locations of the at least one of the one or more automatically-generated annotations;

displaying a vertical time bar in a user interface provided by the media file review and annotation application, the vertical time bar being a temporal representation of the media file and including a time marker indicating a current playback position within the audio track of the media file and further including one or more comment marks representing the temporal locations of at least one of the one or more automatically-generated annotations displayed along the length of the vertical time bar, wherein the positions of the one or more comment marks correspond to the respective temporal locations;

displaying, in the user interface, one or more controls that allow a user to add, edit, or remove annotations associated with the media file; and providing one or more navigation controls that allow the user to manipulate a temporal location within the media file, wherein the time marker is linked to the navigation controls;

selecting a temporal position within the media file using one of the navigation controls to provide a selected temporal position;

determining the one or more comment marks in temporal proximity with the selected temporal position;

synchronizing annotations displayed within a comment control window to correspond with the comment marks determined to be in temporal proximity with the selected temporal position;

editing an annotation associated with the media file at the selected temporal position to provide an annotation edit; and saving the annotation edit in the database.

2. The method of claim 1, wherein editing further comprises:

receiving an instruction provided by the user to add an annotation of the media file to the media review file;

receiving content of the annotation to be added; and storing the content of the annotation to be added in the media review file.

3. The method of claim 1, wherein editing further comprises:

receiving an instruction provided by the user to modify an existing annotation of the media file in the media review file;

receiving revised content of the annotation to be modified; and storing the revised content in the media review file.

4. The method of claim 1, wherein editing further comprises:

receiving an instruction provided by the user to delete an existing annotation of the media file from the media review file;

receiving a confirmation to delete the existing annotation; and removing the existing annotation from the media review file.

5. A computer implemented method of reviewing media files, the method comprising:

accessing, using one or more computers, a media file that includes an audio track;

analyzing the media file with automated analysis software using the one or more computers, wherein the automated analysis software stores in a media review file one or more automatically-generated annotations of content in the media file;

accessing a media review file associated with the media file, wherein the media review file includes a plurality of annotations, the plurality of annotations including the one or more automatically-generated annotations;

presenting the media file within a media file review application, wherein presenting the media file includes:

determining temporal locations within the media file that correspond with each of the annotations contained in the media review file;

displaying a vertical time bar in a user interface of the media file review application, the vertical time bar being a time-based length representation of the audio track within the media file and including a time marker indicating a current playback position within the audio track in the media file;

displaying, along the vertical time bar, comment marks representing the temporal locations of each of the annotations;

displaying one or more controls that allow a user to add, edit, or remove annotations associated with the media file; and providing a navigation control that allows the user to manipulate a temporal location within the media file, wherein the time marker is linked to the navigation control;

selecting a temporal position within the media file using the navigation control;

displaying annotations within a comment control window;

determining the one or more comment marks in temporal proximity with the selected temporal position;

synchronizing the annotations displayed within the comment control window to correspond with the comment marks determined to be in temporal proximity with the selected temporal position; and editing an annotation associated with the media file at the selected temporal position.

6. The method of claim 5, wherein displaying annotations within a comment control window further comprises displaying color-coded annotations, the color-coded annotations each having a color code indicative of a comment category.

* * * * *

UNITED STATES PATENT AND TRADEMARK OFFICE
CERTIFICATE OF CORRECTION

PATENT NO. : 7,739,255 B2
APPLICATION NO. : 11/469719
DATED : June 15, 2010
INVENTOR(S) : Charles M. Hengel et al.

Page 1 of 1

It is certified that error appears in the above-identified patent and that said Letters Patent is hereby corrected as shown below:

In column 7, line 56, in Claim 1, delete "computer implemented" and insert -- computer-implemented --, therefor.

In column 9, line 1, in Claim 5, delete "computer implemented" and insert -- computer-implemented --, therefor.

Signed and Sealed this

Seventeenth Day of August, 2010

David J. Kappos
*Director of the United States Patent and Trademark Office*